US012407972B2

(12) United States Patent
Marti et al.

(10) Patent No.: US 12,407,972 B2
(45) Date of Patent: Sep. 2, 2025

(54) AUDITORY AUGMENTED REALITY USING SELECTIVE NOISE CANCELLATION

(71) Applicant: HARMAN INTERNATIONAL INDUSTRIES, INCORPORATED, Stamford, CT (US)

(72) Inventors: Stefan Marti, Oakland, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 73 days.

(21) Appl. No.: 17/672,461

(22) Filed: Feb. 15, 2022

(65) Prior Publication Data

US 2022/0174395 A1 Jun. 2, 2022

Related U.S. Application Data

(63) Continuation of application No. 16/907,063, filed on Jun. 19, 2020, now Pat. No. 11,284,183.

(51) Int. Cl.
*G10K 11/178* (2006.01)
*H04R 1/10* (2006.01)

(52) U.S. Cl.
CPC ......... *H04R 1/1083* (2013.01); *G10K 11/178* (2013.01); *H04R 2460/01* (2013.01)

(58) Field of Classification Search
CPC ............. H04R 1/1083; H04R 2460/01; G10K 11/178; G10K 2210/1081;
(Continued)

(56) References Cited

U.S. PATENT DOCUMENTS 5,027,410 A 6/1991 Williamson et al.
6,989,744 B2 1/2006 Proebsting
(Continued)

FOREIGN PATENT DOCUMENTS

WO 2008/103925 A1 8/2008
WO WO-2011118595 A1 * 9/2011 ......... G10K 11/1786

OTHER PUBLICATIONS

Basu et al., "Smart Headphones", http://alumni.media.mil.edu/-sbasu/papers/chi2001.pdf, Proceedings of CHI 2001, Seattle, WA, 2001, pp. 267-268.
(Continued)

*Primary Examiner* — Carolyn R Edwards
*Assistant Examiner* — Friedrich Fahnert
(74) *Attorney, Agent, or Firm* — Artegis Law Group, LLP

(57) ABSTRACT

Techniques for auditory augmented reality using selective noise cancellation include receiving an input signal capturing an ambient auditory environment; separating the input signal into a set of audio signals that includes first and second component signals; and in response to generating the set of audio signals: generating a context-sensitive user interface that displays a plurality of first controls for modifying the first component signal and a plurality of second controls for modifying the second component signal, the plurality of first controls being independent from the plurality of second controls; receiving, from a user, a selection to remove the first component signal; and in response to receiving the selection: removing the first component signal from the set of audio signals to generate a modified set of audio signals that includes the second component signal; and driving an audio output device to generate sound based on the modified set of audio signals.

20 Claims, 5 Drawing Sheets

(58) Field of Classification Search
CPC ..... G10K 2210/3025; G10K 11/17823; G10K 11/17873; G10K 11/17885; G10K 2210/30231
USPC .............................................................. 381/1
See application file for complete search history.

(56) References Cited

U.S. PATENT DOCUMENTS

| | | | | |
|---|---|---|---|---|
| 7,512,247 | B1 | 3/2009 | Odinak et al. | |
| 8,081,780 | B2 | 12/2011 | Goldstein et al. | |
| 9,622,013 | B2 | 4/2017 | Di Censo et al. | |
| 9,716,939 | B2 * | 7/2017 | Di Censo | H04R 1/1083 |
| 9,727,129 | B2 * | 8/2017 | Di Censo | G06F 3/167 |
| 10,186,248 | B2 | 1/2019 | Zukowski et al. | |
| 10,388,297 | B2 | 8/2019 | Di Censo et al. | |
| 10,575,117 | B2 * | 2/2020 | Di Censo | G06F 3/167 |
| 2005/0036637 | A1 | 2/2005 | Janssen | |
| 2005/0226425 | A1 | 10/2005 | Polk, Jr. | |
| 2008/0267416 | A1 | 10/2008 | Goldstein et al. | |
| 2010/0076793 | A1 * | 3/2010 | Goldstein | G06F 21/10<br>705/317 |
| 2011/0069843 | A1 | 3/2011 | Cohen et al. | |
| 2011/0107216 | A1 | 5/2011 | Bi | |
| 2012/0215519 | A1 | 8/2012 | Park et al. | |
| 2013/0273967 | A1 | 10/2013 | Dave et al. | |
| 2015/0071457 | A1 | 3/2015 | Burciu | |
| 2018/0302738 | A1 * | 10/2018 | Di Censo | G06F 3/011 |
| 2020/0382859 | A1 * | 12/2020 | Woodruff | H03G 3/3005 |
| 2021/0195278 | A1 * | 6/2021 | Philipp | H04L 67/02 |
| 2021/0264931 | A1 * | 8/2021 | Leider | G10L 15/22 |

OTHER PUBLICATIONS

Mueller, et al., "Transparent Hearing", http://lloydmueller.com/projects/transparent_hearing/, CHI, 2002, 1 page.

* cited by examiner

AUDITORY AUGMENTED REALITY USING SELECTIVE NOISE CANCELLATION

CROSS-REFERENCE TO RELATED APPLICATIONS

The present application is a continuation of United States application titled "AUDITORY AUGMENTED REALITY USING SELECTIVE NOISE CANCELLATION," filed on Jun. 19, 2020, and having Ser. No. 16/907,063. The subject matter of this related application is hereby incorporated herein by reference.

BACKGROUND

Field of the Various Embodiments

Embodiments disclosed herein relate to sound modification and, in particular, auditory augmented reality using selective noise cancellation.

Description of the Related Art

Various audio products employ techniques to remove or attenuate unwanted sounds included in an ambient environment such that a user can listen to a desired audio source. In many cases, headphones generally provide a degree of passive noise attenuation by fully or partially obstructing the ear canal of the wearer. Additionally, some headphones provide active noise attenuation by generating sound waves that cancel sounds within the environment. Some conventional devices also attempt to provide the sounds of the ambient environment by recording the ambient environment and including the recording in the sound reproduced by an audio output device. In such instances, the output device is "acoustically transparent," meaning that the audio product does not alter the auditory field or environment experienced by a user.

One drawback of these conventional approaches is that, by canceling all sound in the ambient environment, the user is isolated from sounds in the surrounding environment. When the user is isolated from sounds in the surrounding environment, the user can miss sounds that may be of interest to the user, such as speech from other people (e.g., announcements at an airport, someone calling for the user). Alternatively, when providing sounds of interest, conventional approaches reproduce then entire ambient environment, exposing the user to undesirable noise and detracting from the overall enjoyment of the listening experience.

As the foregoing illustrates, what is needed are more effective techniques for noise attenuation.

SUMMARY

Various embodiments include a computer-implemented method comprising receiving an input signal representing an ambient auditory environment of a user, generating, from the input signal, a set of ambient audio signals that includes a first component signal and a second component signal, generating, based on the first component signal, a first inverse signal that is a polar inverse of the first component signal, removing the first component signal from the set of ambient audio signals, generating a first composite signal that includes at least the first inverse signal and the second component signal, and driving an audio output device to produce soundwaves based on the first composite signal.

Further embodiments provide, among other things, a system and a non-transitory computer readable storage medium configured to implement the method set forth above.

At least one technological advantage of the disclosed approach relative to the prior art is that by executing active noise cancellation on selected sounds, the disclosed approach enables a system to prevent a user from hearing particular sounds by removing a selected sound from a reproduced ambient acoustic environment, as well as by cancelling bleeding sounds that are not removed using other noise cancellation techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Overview

Embodiments disclosed herein include a transparent sound modification system that includes one or more sensors arranged to detect sounds within an environment, and one or more output devices that provide a modified audio signal to a user. A processing unit included in the transparent sound modification system operates to detect sounds within the environment and generate a modified audio signal that attenuates or removes at least one of the detected sounds and to generate a modified ambient signal. The processing unit also provides active noise cancellation for the detected sound that is attenuated or removed by generating an inverse sound signal based on the detected sound. The processing unit combines the inverse sound signal with the modified ambient signal to generate a composite ambient signal. The processing unit combines the composite ambient signal with an audio source signal to generate a combined audio signal. In instances where a removed sound nonetheless leaks through the audio output device and would otherwise be heard by the user as a bleeding sound, the inverse sound signal included in the modified ambient signal is reproduced by the output device and actively cancels the bleeding sound. The user therefore hears a combined signal that includes only the audio source signal and the portions of the detected sounds that were not attenuated or removed.

The transparent sound modification system may be implemented in various forms of audio-based systems, such as personal headphones, home stereo systems, car stereo systems, etc. The transparent sound modification system may selectively provide active noise attenuation for selected sound sources. The transparent sound modification system may perform its processing functions using a dedicated processing device and/or a separate computing device, such as a user's mobile computing device or a cloud computing system. The transparent sound modification system may detect sounds from the environment using any number of sensors, which may be attached to or integrated with other system components, or disposed separately. The detected sounds, location information, and user inputs, such as selected sound sources or selected sound source directions, may be used to separate, isolate, and remove specific sounds in the environment while transmitting other sounds within the environment in order to provide user-configurable acoustic transparency.

System

Figure 1:
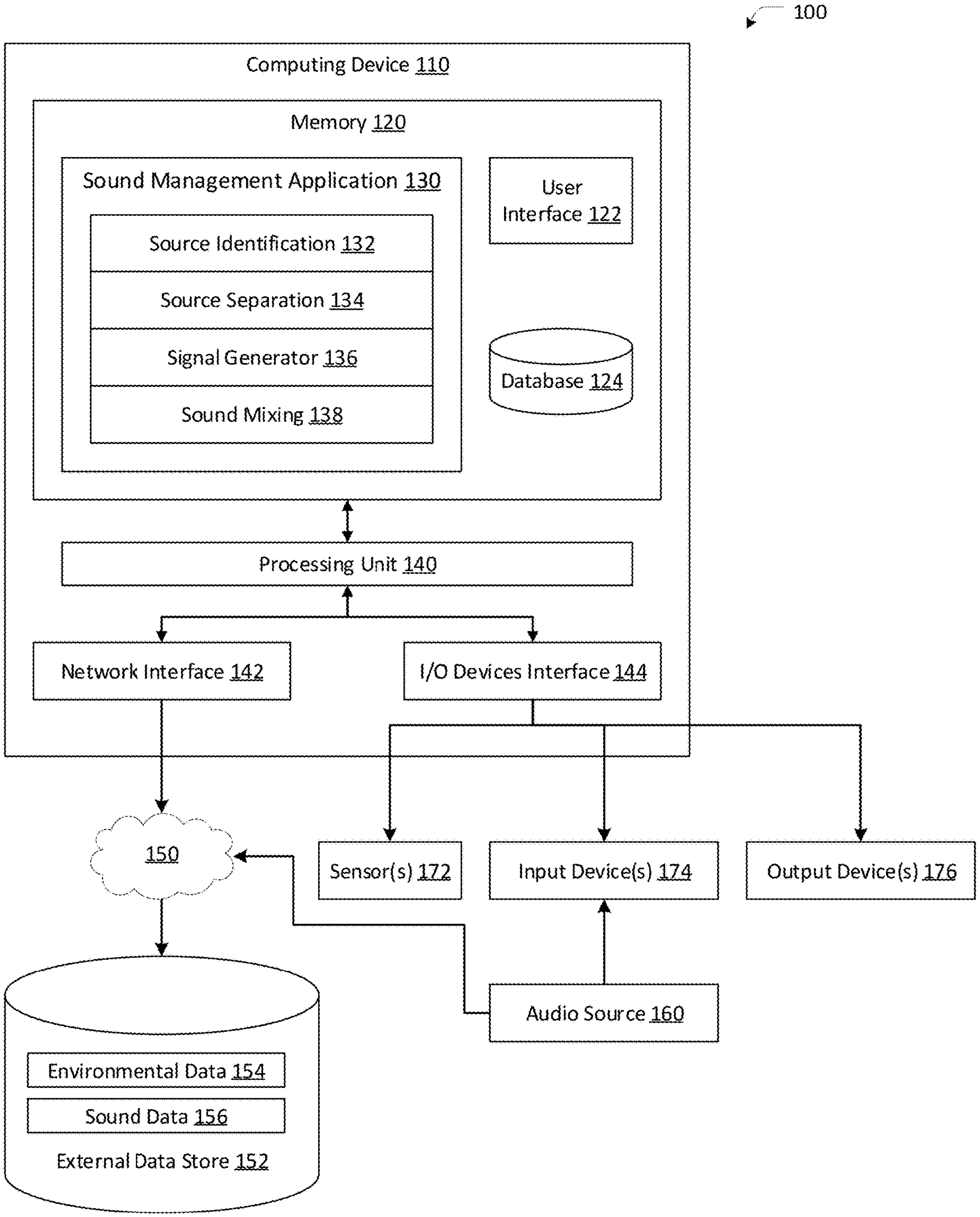
FIG. 1 illustrates a transparent sound modification system according to one or more embodiments.

FIG. 1 illustrates a transparent sound modification system according to one or more embodiments. As shown, transparent sound modification system 100 includes computing device 110, network 150, external data store 152, audio source 160, sensor(s) 172, input device(s) 174, and output device(s) 176. Computing device 110 includes memory 120, processing unit 140, network interface 142, and input/output devices interface 144. Memory 120 includes user interface 122, database 124, and sound management application 130.

Computing device 110 includes processing unit 140 and memory 120. In various embodiments, computing device 110 may be a device that includes one or more processing units 140, such as a system-on-a-chip (SoC). In some embodiments, computing device 110 may be a wearable device, such as headphones, hearing aids, portable speakers, and/or other devices that include processing unit 140. In other embodiments, computing device 110 may be a mobile computing device, such as a tablet computer, mobile phone, media player, and so forth. In some embodiments, computing device 110 may be a head unit included in a vehicle system or at-home entertainment system. Generally, computing device 110 can be configured to coordinate the overall operation of transparent sound modification system 100. The embodiments disclosed herein contemplate any technically-feasible system 100 configured to implement the functionality of transparent sound modification system 100 via computing device 110.

In various embodiments, one or more of computing device 110, sensor(s) 172, input device(s) 174, and/or output device(s) 176 may be included in one or more devices, such as mobile devices (e.g., cellphones, tablets, laptops, etc.), wearable devices (e.g., watches, rings, bracelets, headphones, etc.), consumer products (e.g., gaming, gambling, etc.), smart home devices (e.g., smart lighting systems, security systems, digital assistants, etc.), communications systems (e.g., conference call systems, video conferencing systems, etc.), and so forth. Computing device 110 may be located in various environments including, without limitation, road vehicle environments (e.g., consumer car, commercial truck, etc.), aerospace and/or aeronautical environments (e.g., airplanes, helicopters, spaceships, etc.), nautical and submarine environments, and so forth.

For example, a wearable device could include at least one microphone as sensor 172, at least one speaker as output device 176, and a microprocessor-based digital signal processor (DSP) as processing unit 140 that produces audio signals that drive the at least one speaker to emit soundwaves. In some embodiments, transparent sound modification system 100 may be included in headphones with individual earpieces, or ear bud sets, where each earpiece or ear bud contains a speaker, one or more microphones, and/or one or more transducers. In such instances, the one or more microphones may include an ambient microphone (e.g., sensor 172(1)) that detects ambient sounds originating from sound sources within the ambient auditory environment, and an internal microphone (e.g., sensor 172(2)) used in a closed-loop feedback control system for cancellation of user-selected sounds from the ambient auditory environment.

In various embodiments, computing device 110 may operate in a processing mode that drives output device(s) 176 such that output device(s) 176 are, at least in part, acoustically transparent, meaning transparent sound modification system 100 does not alter the environment experienced by the user relative to the current ambient auditory environment. Providing acoustic transparency causes transparent sound modification system 100 to refrain from altering one or more source sounds included in the ambient auditory environment. For example, computing device 110 could drive speakers 176 included in a pair of headphones to reproduce the ambient auditory environment as an audio signal.

In various embodiments, computing device 110 may attenuate a portion of sounds, such as particular portions associated with one or more source sounds in the ambient auditory environment. In such instances, transparent sound modification system 100 analyze the ambient auditory environment to identify one or more sound sources and may provide controls associated with each of the sound sources and/or sound types. The user may then customize her auditory environment by selecting specific sound sources and/or specific sound types to reproduce, amplify, attenuate, and/or remove from the ambient auditory environment. In such instances, transparent sound modification system 100 may separate signals based on the set of sounds. In various embodiments, transparent sound modification system 100 may, through a combination of passive and/or active attenuation or cancellation, block the user from hearing sounds associated with the selected sound sources and/or sound types. At the same time, transparent sound modification system 100 may reproduce a composite ambient signal that includes only sounds associated with the sound sources and/or sound types that the user selected for full reproduction and/or amplification.

In alternative embodiments, various components of transparent sound modification system 100 may be contained within, or implemented by, different kinds of wearable devices and/or non-wearable devices. For example, one or more of computing device 110, sensor(s) 172, input device (s) 174, and/or output device(s) 176 may be disposed within a hat, scarf, shirt collar, jacket, hood, etc. Similarly, processing unit 140 may provide the user interface via output device(s) 176 included in a separate mobile or wearable device, such as a smartphone, tablet, wrist watch, arm band, etc. The separate mobile or wearable device may include an associated microprocessor and/or a digital signal processor that may also be used to provide additional processing power to augment the capabilities of the computing device 110.

Processing unit 140 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. Processing unit 140 generally comprises a programmable processor that executes program instructions to manipulate input data. In some embodiments, processing unit 140 may include any number of processing cores, memories, and other modules for facilitating program execution.

For example, processor unit 140 could receive input from a user via input device(s) 174 and drive output device(s) 176 to emit soundwaves. In some embodiments, processing unit 140 can be configured to execute sound management application 130 in order to analyze acquired sensor data from sensor(s) 172 and modify the ambient sounds to be included in an output audio signal. In such instances, sound management application 130 may generate a modified ambient signal that removes selected ambient sound signals. Sound management application 130 may also generate, for each selected ambient sound signal selected for removal, a corresponding anti-noise signal that is the polar inverse of the selected ambient sound signal. In such instances, the anti-noise signal may cancel the selected ambient sound that bleeds through the output device ("bleeding sound") such that the user does not hear the selected ambient sound, either as a portion of the audio signal reproduced by output device(s) 176, or as a bleeding sound heard directly from the environment.

Memory 120 includes a memory module, or collection of memory modules. Memory 120 may include a variety of computer-readable media selected for their size, relative performance, or other capabilities: volatile and/or non-volatile media, removable and/or non-removable media, etc. Memory 120 may include cache, random access memory (RAM), storage, etc. Memory 120 may include one or more discrete memory modules, such as dynamic RAM (DRAM) dual inline memory modules (DIMMs). Of course, various memory chips, bandwidths, and form factors may alternately be selected.

Non-volatile memory included in memory 120 generally stores application programs including user interface 122 and/or sound management application 130, and data (e.g., data stored in database 124) for processing by processing unit 140. In various embodiments, memory 120 may include non-volatile memory, such as optical drives, magnetic drives, flash drives, or other storage. In some embodiments, separate data stores, such as external data store 152 included in network 150 ("cloud storage") may supplement memory 120. Sound management application 130 within memory 120 can be executed by processing unit 140 to implement the overall functionality of computing device 110 and, thus, to coordinate the operation of transparent sound management system 100 as a whole.

In various embodiments, memory 120 may include one or more modules for performing various functions or techniques described herein. In some embodiments, one or more of the modules and/or applications included in memory 120 may be implemented locally on computing device 110, and/or may be implemented via a cloud-based architecture. For example, any of the modules and/or applications included in memory 120 could be executed on a remote device (e.g., smartphone, a server system, a cloud computing platform, etc.) that communicates with computing device 110 via network interface 142 or I/O devices interface 144.

Sound management application 130 analyzes incoming sensor data and generates a composite ambient signal that attenuates and/or removes specific ambient sound signals that were included in the sensor data. In various embodiments, sound management application 130 may send a combined audio signal to output device(s) 176 that causes output device(s) 176 to emit soundwaves.

Sound management application 130 includes one or more modules to identify portions of acquired sensor data (e.g., acquired audio data that includes an input audio signal) and modify portions of the acquired sensor data to be included in an output audio signal. For example, as shown, sound management module 130 includes source identification module 132, source separation module 134, signal generation module 136, and sound mixing module 138.

Source identification module 132 identifies detected sound types, sound sources, and/or identifies "sound scenes" based on detected sounds. In some embodiments, source identification module 132 may execute various speech recognition, noise recognition, and/or other sound source identification techniques in order to identify portions of captured audio. For example, source identification module 132 could identify a specific sound scene, such as a park, by identifying different sound sources, including various bird calls, rustling leaves, running humans, and so forth. Additionally or alternatively, source identification module 132 may identify specific sound sources within a particular sound type. For example, source identification module 132 could identify two separate barking dogs within the input audio signal.

In some embodiments, source identification module 132 may store sound samples as sound data in database 124 and/or sound data 156 in external data store 152 and may identify a particular sound source by determining that a portion of the input audio signal matches stored sound data associated with a particular sound source. For example, a user could store the bark of a neighbor's dog as sound data stored locally in database 124. Source identification module 132 could then compare a portion of an input audio signal to the stored sound data. Upon determining that the portion of the input audio signal is substantially similar to the stored sound data, source identification module 132 could then identify the portion of the input audio signal as originating from the neighbor's dog.

Source separation module 134 separates the input audio signal into separate component signals. In various embodiments, source separation module 134 may separate the input audio signal into separate signals based on the identified sounds and/or identified sound types that were determined by source identification module 132. In such instances, source separation module 134 may generate distinct component audio signals from input audio signal such that each component audio signal may be separately modified. In some embodiments, source separation module 134 may separate the input audio signal into separate audio channels. In such instances, sound management application 130 may modify audio channel parameters (e.g., bandwidth, power level, etc.) in order to reproduce, amplify, attenuate, or remove a particular sound included in a specific audio channel.

Signal generation module 136 generates one or more audio signals to provide desired sound modifications. For example, signal generation module 136 could produce anti-noise signals that are scaled and/or polar inverse version of a given detected sound. In some embodiments, signal generation module 136 may also generate other waveforms in order to produce a desired sound modification. For example, signal generation module 136 may generate a periodic audio signals or random noise for use by one or more other modules.

Sound mixing module 138 combines multiple audio signals. For example, sound mixing module 138 could generate a modified ambient signal after selected ambient signals are removed by combining the remaining ambient signals. Similarly, sound mixing module 138 could generate a composite ambient signal by mixing the modified ambient signal with one or more anti-noise signals.

User interface 122 enables a user to provide input(s) about specific sound sources and/or sound types included in an ambient auditory environment that system 100 is to reproduce, amplify, attenuate, or remove. In various embodiments, user interface may provide other functions to enhance a sound; for example, user interface 122 may include equalization and/or filter controls. The user selections provided via user interface 122 are communicated to computing device 110 to control corresponding processing of input signals to create auditory output signals that implement the user's preferences. In some embodiments, user interface 122 may take any feasible form for providing the functions described herein, such as one or more buttons, toggles, sliders, dials, knobs, etc., or as a graphical user interface (GUI).

The GUI may be provided through any component of the transparent sound modification system 100. In one embodiment, the GUI may be provided by a separate computing device that is communicatively coupled with computing device 110, such as through an application running on a user's mobile or wearable computing device. To provide preferential selection of sound modification, user interface 122 may allow user input for various parameters such as direction(s), sound types, specific sound sources, and/or amount of sound modification to be performed. The parameters may be updated by the user or may be automatically updated during operation.

In another example, user interface 122 may receive verbal commands for user selections. In this case, computing device 110 may perform speech recognition on the received verbal commands and/or compare the verbal commands against commands stored in memory 120. After verifying the received verbal commands, computing device 110 could then execute the commanded function for transparent sound modification system 100 (e.g., altering sound modification parameters to specified levels).

Database (DB) 124 may store values and other data retrieved by processing unit 140 to coordinate the operation of transparent sound modification system 100. In various embodiments, in operation, processing unit 140 may be configured to store values in database 124 and/or retrieve values stored in database 124. For example, database 124 may store sensor data, audio content, and reference audio (e.g., one or more reference audio signals) digital signal processing algorithms, transducer parameter data, and so forth.

In some embodiments, sound management application 130 may cause various signal characteristics of representative or average sounds of a particular sound group or sound type to be extracted and stored in database 124. These signal characteristics of representative sounds of a particular sound source or sound type may be used as a reference. In such instances, sound management application 130 (e.g., source identification module 132) may compare sounds from the current ambient auditory environment with the reference sounds in order to identify the particular sound source or sound type. In some embodiments, specific sound references may be dynamically stored in database 124 based on the location of computing device 110.

In some embodiments, database 124 may store other data acquired by computing device 110, such as orientation data that reflects the relative orientation of sensor 172, output device 176, and/or computing device 110. Additionally or alternatively, database 124 may store location data that reflects a geographic location of sensor 172, output device 176, and/or computing device 110.

In some embodiments, computing device 110 may communicate with other devices, such as sensor(s) 172, input device(s) 174, and/or output device(s) 176, using input/output (I/O) devices interface 144. In such instances, I/O devices interface 144 may include any number of different I/O adapters or interfaces used to provide the functions described herein. For example, I/O devices interface 144 may include wired and/or wireless connections, and may use various formats or protocols. In another example, computing device 110, through I/O devices interface 144, could determine selected user inputs from input device(s) 174, may detect ambient sounds using audio sensor(s) 172, and may provide appropriate audio signals to output device(s) 176 to produce desired sound modifications for detected sounds. In another example, computing device 110 could, via I/O devices interface 144, determine selected directions for sound modification using location data obtained from a separate computing device (e.g., a smartphone) that is connected using input device(s) 174.

In some embodiments, computing device 110 may communicate with other devices, such as external data store 152 and/or audio source 160, using network interface 142 through network 150. In some embodiments, other types of networked computing devices (not shown) may connect to computing device 110 via network interface 142. Examples of networked computing devices include a server, a desktop computer, a mobile computing device, such as a smartphone or tablet computer, and/or a worn device, such as a watch or headphones or a head-mounted display device. In some embodiments, the networked computing devices may be used as audio sensor(s) 172, input device(s) 174, and/or output device(s) 176.

Network 150 includes a plurality of network communications systems, such as routers and switches, configured to facilitate data communication between computing device 110 and external data store 152. Persons skilled in the art will recognize that many technically-feasible techniques exist for building network 150, including technologies practiced in deploying an Internet communications network. For example, network 150 may include a wide-area network (WAN), a local-area network (LAN), and/or a wireless (Wi-Fi) network, among others.

External data store 152 includes sound libraries having stored sound data and/or other data use by computing device 110. For example, external data store 152 could include environmental data 154 that computing sound management application 130 could use to identify the location of the ambient auditory environment and filter the set of reference sounds to which source identification module 132 references. In another example, external data store 152 could include sound data 156 that source identification module 132 could access when identifying a particular sound source and/or sound type from the ambient audio environment.

Environmental data 154 includes data associated with the location of the ambient auditory environment. In various embodiments, environmental data 154 includes location data that specifies sound types and/or reference sounds associated with specific geographic locations and/or preset sound scenes (e.g., park, construction site, etc.). In various embodiments, a sound scene is an aggregation of sounds of one or more types associated with a certain setting. For example, a traffic sound scene could be an aggregation of sounds associated with street and/or highway traffic, such as sounds of cars travelling on a road, sounds of car horns, and so forth. In some embodiments, environmental data 154 may include direction data that reflects directions of sounds for sound modification within the ambient auditory environment.

Sound data 156 includes samples of individual sounds for use by source identification module 132 in identifying detected sounds. For example, sounds data 156 could include samples of sounds originating from cars, construction equipment, jackhammers, baby cries, human voices, barking dogs, and so forth. In some embodiments, sound data 156 may also include data used associated with reference sounds included in specific sound scenes.

Audio source 160 provides a source audio signal that computing device 110 sends to output device(s) 176 in order to be heard by the user. In various embodiments, audio source 160 may be a music player, an alert broadcaster, a stadium announcer, a store or theater, a conversation application (e.g., telephone application, video conferencing application, etc.) Streaming data may be provided directly from audio source 160 to the network interface 142 computing device 110 via network 150 through a wireless connection, such as Bluetooth® (a registered trademark of the Bluetooth Special Interest Group), Wi-Fi® (a registered trademark of the Wi-Fi Alliance) a cellular network, etc. Data streaming or downloads could also be provided over a local or wide-area network (WAN), such as the Internet, for example. In some embodiments, audio source may connect to computing device 110 via input device(s) 174 (e.g., a mobile device, a wired connection, etc.).

Sensor(s) 172 include one or more devices that collect data associated with objects in an environment. In various embodiments, sensor(s) 172 may include groups of sensors that acquire different sensor data. For example, sensor(s) 172 could include a reference sensor, such as a microphone and/or a position tracker (e.g., camera, thermal imager, linear position sensor, etc.), which could acquire sound data and/or location data (e.g., direction, relative position, etc.).

In various embodiments, sensor(s) 172 may include audio sensors, such as a microphone and/or a microphone array that acquires sound data. Such sound data may be processed by sound management application 130 using various audio processing techniques. The audio sensors may be a plurality of microphones or other transducers or sensors capable of converting sound waves into an electrical signal. The audio sensors may include an array of sensors that includes sensors of a single type, or a variety of different sensors. Sensor(s) 172 may be worn by a user, disposed separately at a fixed location, or movable. Sensor(s) 172 may be disposed in any feasible manner in the environment. In various embodiments, sensor(s) 172 are generally oriented outward relative to output device(s) 176, which are generally disposed inward of sensor(s) 172 and also oriented inward. Such an orientation may be particularly beneficial for isolating one or more regions for which sound modification is to be performed (i.e., using output from the output device(s) 176) from the rest of the environment. In one example, sensor(s) 172 may be oriented radially outward from a user, while the output device(s) 176 are oriented radially inward toward the user.

Additionally or alternatively, sensor(s) 172 may include position sensors, such as an accelerometer or an inertial measurement unit (IMU). The IMU may be a device like a three-axis accelerometer, gyroscopic sensor, and/or magnetometer. In some embodiments, sensor(s) 172 may include optical sensors, such RGB cameras, time-of-flight sensors, infrared (IR) cameras, depth cameras, and/or a quick response (QR) code tracking system. In addition, in some embodiments, sensor(s) 172 may include wireless sensors, including radio frequency (RF) sensors (e.g., sonar and radar), ultrasound-based sensors, capacitive sensors, laser-based sensors, and/or wireless communications protocols, including Bluetooth, Bluetooth low energy (BLE), wireless local area network (Wi-Fi) cellular protocols, and/or near-field communications (NFC).

Input device(s) 174 are devices capable of receiving one or more inputs. In various embodiments, input device(s) 174 may include one or more audio input devices, such as a microphone, a set of microphones (e.g., a reference microphone and an error microphone), and/or a microphone array. Additionally or alternatively, input device(s) 174 may include other devices capable of receiving input, such as a keyboard, a mouse, a touch-sensitive screen, and/or other input devices for providing input data to computing device 110. For example, a user's input may include gestures, such as various movements or orientations of the hands, arms, eyes, or other parts of the body that are received via a camera.

Output device(s) 176 include devices capable of providing output, such as a display screen, loudspeakers, and the like. For example, output device 176 could be headphones, ear buds, a speaker system (e.g., one or more loudspeakers, amplifier, etc.), or any other device that generates an acoustic field. In various embodiments, various input device(s) 174 and/or output device(s) 176 can be incorporated into computing device 110, or may be external to computing device 110.

In various embodiments, output device(s) 176 may be implemented using any number of different conventional form factors, such as discrete loudspeaker devices, around-the-ear (circumaural), on-ear (supraaural), or in-ear headphones, hearing aids, wired or wireless headsets, body-worn (head, shoulder, arm, etc.) listening devices, body-worn close-range directional speakers or speaker arrays, body-worn ultrasonic speaker arrays, and so forth. In some embodiments, output device(s) 176 may be worn by a user, or disposed separately at a fixed location, or movable. As discussed above, output device(s) 176 may be disposed inward of the sensor(s) 172 and oriented inward toward a particular region or user.

Auditory Augmented Reality using Selective Noise Cancellation

Figure 2:
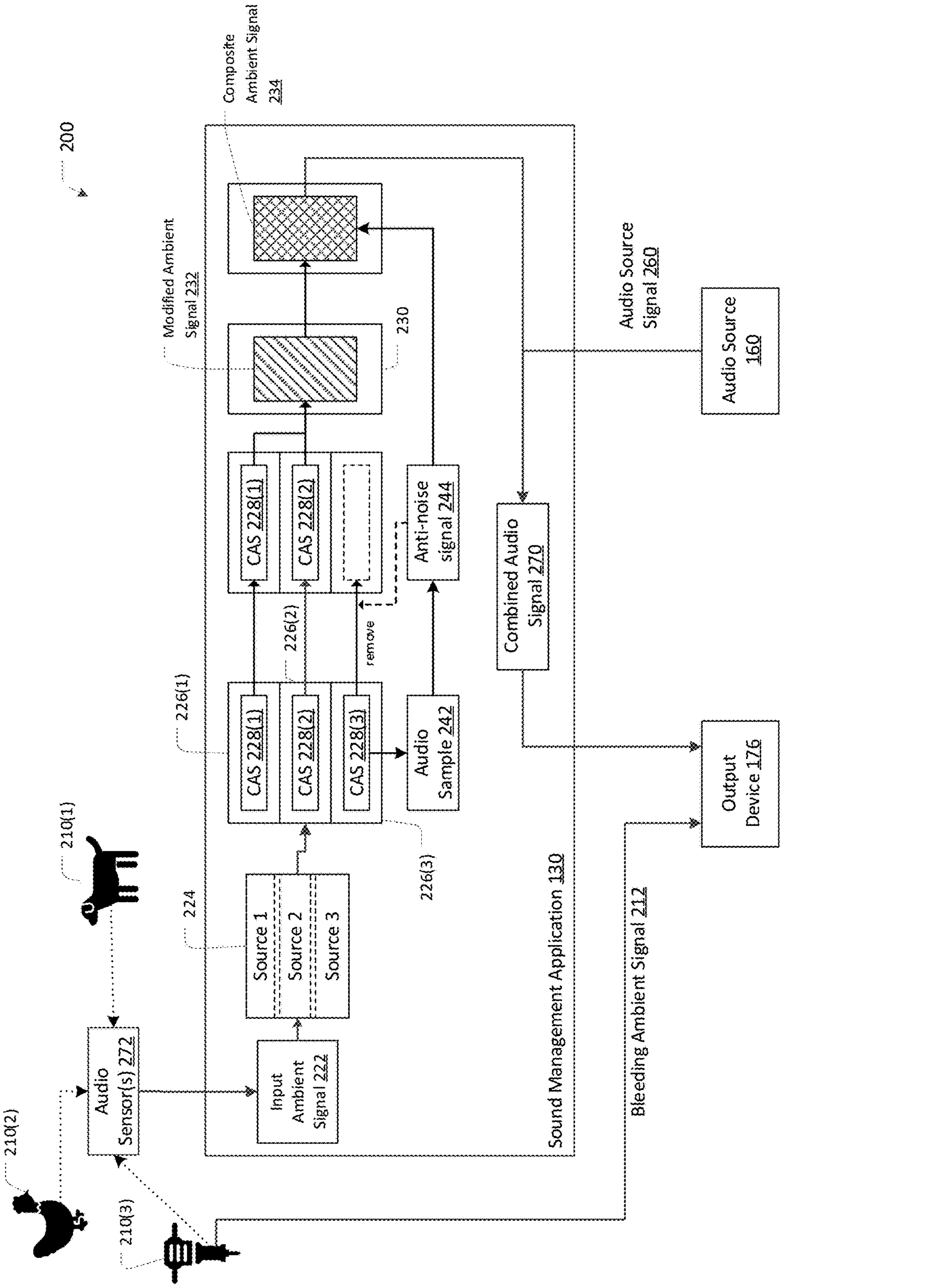
FIG. 2 illustrates a technique of the transparent sound modification system of FIG. 1 applying active noise cancellation to a portion of an ambient audio signal, according to one or more embodiments.

FIG. 2 illustrates a technique of transparent sound modification system 100 of FIG. 1 applying active noise cancellation to a portion of an ambient audio signal, according to one or more embodiments. As shown active noise cancellation technique 200 includes sound management application 130, audio sensor(s) 272, and audio source 160.

In operation, audio sensor(s) 272 acquires sensor data originating from sound sources 210 (e.g., 210(1), 210(2), 210(3)) and transmit the acquired sensor data as input ambient signal 222 to sound management application 130. Sound management application 130 processes and modifies input ambient signal 222 to generate composite ambient signal 234. Sound management application 130 combines composite ambient signal 234 with audio source signal 260, originating from audio source 160, to generate combined audio signal 270. In operation, composite ambient signal 234 includes anti-noise signal 244 that, when reproduced as a soundwave, cancels bleeding ambient sound 212 originating from one of the sound sources (e.g., sound source 210(3)) such that bleeding ambient sound 212 is not heard by the user.

Audio sensor(s) 272 acquire audio data from one or more sound sources 210 included in an environment, where the detected sounds form an ambient auditory environment. For example, the ambient auditory environment includes multiple sound sources 210, including a barking dog 210(1), chirping bird 210(2), and an active jackhammer 210(3). Audio sensor(s) 272 sends the acquired audio data to sound management application 130 that processes the audio data as single input ambient signal 222.

Sound identification module 132 analyzes input ambient signal 222 in order to identify individual sound sources 224. For example, source identification module 132 could compare portions of input ambient signal 222 to one or more reference sounds stored in database 124 and/or external data store 152 in order to identify individual sound sources. In some embodiments, source identification module 132 may compare input ambient signal 222 to sounds within a reference sound scene in order to identify particular sound sources 210(1)-210(3) that originated portions of input ambient signal 222.

Sound separation module 134 separates input ambient signal 222 into multiple component ambient signals 228 (e.g., 228(1), 228(2), 228(3)). As shown, for example, each component ambient signal corresponds to a distinct sound source, with component ambient signal 228(1) originating from barking dog 210(1), component ambient signal 228(2) corresponding to chirping bird 210(2), and component ambient signal 228(3) corresponding to active jackhammer 210(3). In alternative embodiments, source separation module 134 may attempt to separate input ambient signal 222 into separate component signals, and source identification module 132 identifies the sound source 210 for each separate component ambient signal 228.

In various embodiments, source separation module 134 may include each component ambient signal 228 in a separate audio channel 226. For example, component ambient signal 228(3) may be included in audio channel 226(3), which sound management application 130 processes independent of audio channels 226(1), 226(2). In some embodiments, sound management application 130 may dynamically generate user interface 122 based on the set of component ambient signals 228. For example, sound management application 130 could cause user interface 122 to include separate controls corresponding to component ambient signals 228(1), 228(2), 228(3). In such instances, a user may provide separate controls of each component ambient signal. Alternatively, sound management application 130 may load a stored GUI that includes pre-defined sets of controls (e.g., an airport mode preset GUI).

Sound management application 130 may then modify each component ambient signal 228 based on selections made by the user via user interface 122. For example, a user could opt to remove the active jackhammer 210(3) from the ambient sounds that she hears. In such instances, sound management application 130 may use sound mixing module 138 to remove the signal from audio channel 226 (as illustrated by the empty box). In some embodiments, sound management application 130 may apply active cancellation to component ambient signal 228(3) by having signal generation module 136 generate a corresponding anti-noise signal that is used significantly attenuate or cancel the component ambient signal. Additionally or alternatively, sound management application 130 may modify parameters of audio channel 226(3), such as lowering the power of the audio channel. In some embodiments, sound mixing module 138 may amplify other component ambient signals 228, such as amplifying component ambient signal 228(2) (originating from chirping bird 210(2)).

Sound management application 130 may then combine the remaining component ambient signals 228(1), 228(2) to generate modified ambient signal 232. In some embodiments, sound management application 130 may combine audio channels 226 into a single combined channel 230. When mixing the remaining component ambient channels, the removed component ambient signal is not included.

In some embodiments, sound management application 130 may, in parallel, take audio sample 242 corresponding to each component ambient signal 228 that was removed. For example, sound management application 130 could generate audio sample 242 from component ambient signal 228(3) that was removed from audio channel 226(3). In some embodiments, audio sample 242 is a reproduction of the removed component ambient signal 228(3). Alternatively, sound management application 130 may directly process the removed component ambient signal 228(3) in lieu of generating a reproduction. Signal generation module 136 may generate an anti-noise signal 244 that is a polar inverse of audio sample 242. In such instances, audio sample 242 and anti-noise signal 244 cancel when combined.

Upon generating anti-noise signal 244, sound mixing module 138 combines anti-noise signal 244 with modified ambient signal 232 to generate composite ambient signal 234. Composite ambient signal 234 includes each component ambient signal 228 that the user selected to hear (e.g., component ambient signals 228(1), 228(2)), as well as anti-noise signals 244 corresponding to each component ambient signal 228(3) that the user selected for removal.

Sound mixing module 138 generates combined audio signal 270 by mixing composite ambient signal 234 with an audio source signal 260 that is provided by audio source 160. Because combined audio signal 270 includes both the audio source signal 260 and the composite ambient signal 234, sound management application 130 drives an audio output device 176 to emit soundwaves that include both source audio and ambient sounds. Thus, the user can hear a selectively-transparent signal along with a desired audio source signal 260, as at least a portion of the ambient auditory environment is reproduced by output device 176 emitting soundwaves based on combined audio signal 270.

In various embodiments, one or more sound sources 210 may generate sounds that leak through various passive noise cancellation barriers. For example, when a user is wearing headphones, a sound source 210(3) could generate sounds, represented by bleeding ambient sound 212, that leak through passive noise cancellation barrier provided by the ear pad of the headphones and could potentially be heard by the user. In such instances, the anti-noise signal 244 included in composite ambient signal 234 and combined audio signal 270 cancels the bleeding ambient sound 222. As a result, when output device 176 produces soundwaves based on combined audio signal 270, at least a portion of the soundwaves provides active cancellation by canceling bleeding ambient sound 222 such that bleeding ambient sound 222 is not heard by the user.

Figure 3:
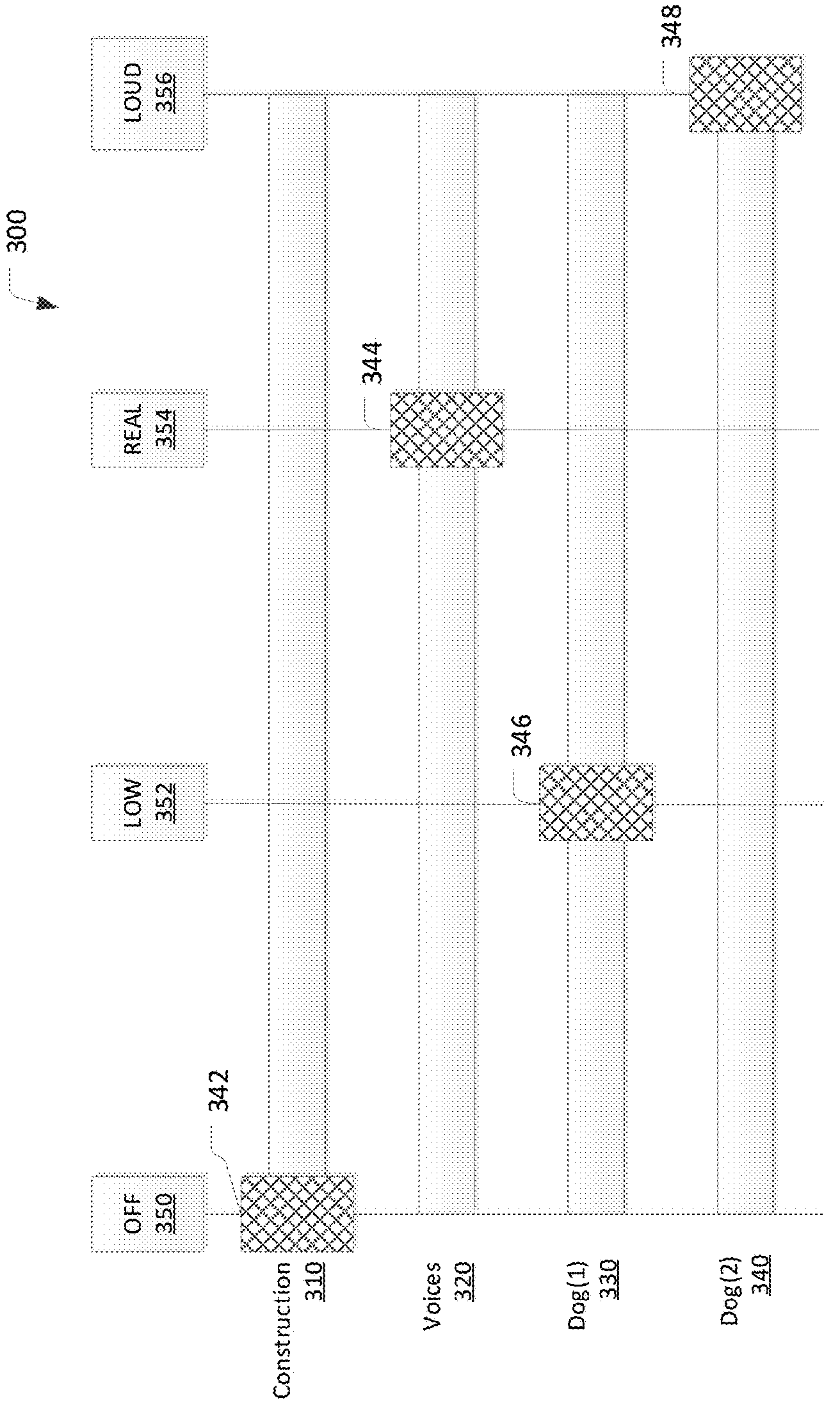
FIG. 3 illustrates an example user interface provided by the transparent sound modification system of FIG. 1 to control portions of an ambient audio signal, according to one or more embodiments.

FIG. 3 illustrates an example user interface 300 provided by the transparent sound modification system 100 of FIG. 1 to control portions of an ambient audio signal, according to one or more embodiments.

User interface 300 enables the user to create a preferential auditory experience by setting preferences with respect to what ambient sounds to hear, dim, amplify, or not hear at all. In operation, a user sets auditory preferences via user interface 300 that may be implemented by computing device 110 or by a second computing device, such as a smartphone, tablet computer, smartwatch, etc. In some embodiments, user preferences represented in user interface 300 may be associated with particular sound sources (e.g., dog (1) 330, dog (2) 340) and/or sound types, groups, or categories of sounds (e.g., construction 310, voices 320). Additionally or alternatively, user interface 300 and may include one or more modifications to the associated sound, such as cancellation (e.g., "off" setting 350), attenuation (e.g., "low" setting 352), reproduction (e.g., "real" setting 354), and/or amplification (e.g., "loud" setting 356) settings. Upon the user setting individual controls 542-548 corresponding to the distinct sound sources and/or sound types 310-340, commands are sent to sound management application 130 in order to further process component ambient signals 228.

In some embodiments, user interface 300 may be a context-sensitive or context-aware user interface. In such instances, sound management application 130 may first identify individual sound sources 224 and/or sound types and may also separate input ambient signal 222 into component ambient signals 228. Sound management application 130 may then generate user interface 300 based on the identified sound sources 224 and/or the component ambient signals 228.

When control 342 at the "off" setting 350, sound management application 130 may then attenuate the associated component ambient signal such the user cannot hear the sound when listening to combined audio signal 270. In some embodiments, sound management application 130 may apply active cancellation to the component ambient signal by generating a corresponding anti-noise signal that is used significantly attenuate or cancel the component ambient signal. Additionally or alternatively, sound management application 130 may modify parameters of the audio channel corresponding to the component ambient signal, such as lowering the power of the audio channel.

The real setting 354 corresponds to substantially replicating the sound level from the ambient auditory environment to the user, such as if the user is not wearing a device that attenuates ambient sounds. In such instances, sound management application 130 may process the component ambient signal without significant attenuation or amplification.

The low setting 352 corresponds to some attenuation, or relatively lower amplification, of a given component ambient signal relative to the component ambient signals represented by user interface 300. The loud setting 356 corresponds to amplification of a component ambient signal relative to other sounds and/or the level of that sound in the ambient auditory environment.

In other embodiments, user interface 300 controls that enable a user to specify sound levels or sound pressure levels (SPL) for individual audio channels. For example, user interface 300 could include controls to specify percentages of an initial loudness value a particular audio channel. In some embodiments, user interface 300 may specify sound level values as sound pressure levels (dBA SPL) and/or attenuation/gain values (e.g., specified in decibels). For example, a user may move a selector, to an attenuation value of −20 decibels (dB) (e.g., corresponding to a low setting 352) when the user would like to attenuate a particular sound. Further, the user may move a selector to a value of 0 dB (e.g., corresponding to the real setting 354) when the user would like to pass-through a particular sound. In addition, the user may move a selector toward a gain value of +20 dB (e.g., corresponding to the loud setting 356) when the user would like to enhance a particular sound by increasing the loudness of the sound.

In various embodiments, the individual settings 310-340 may be directed to more specific sound types or sound classes. For example, sound management application 130 may provide user interface 300 that includes individual controls, such as main voices, other voices, or TV voices. Similarly, controls for noises may include sub-controls or categories for birds, traffic, construction, machinery, airplane, etc.

Figure 4:
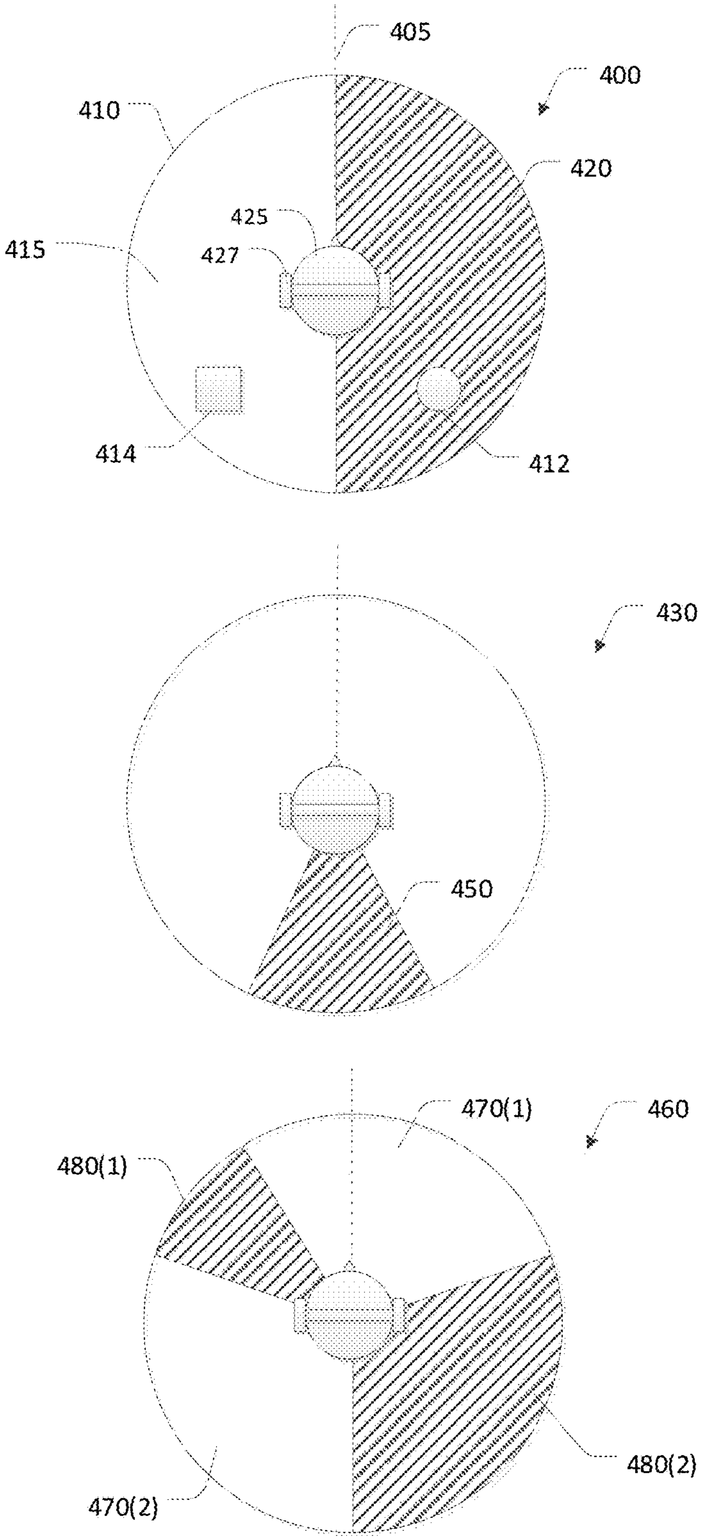
FIG. 4 illustrates selection of directions within an environment for the transparent sound modification system of FIG. 1 to modify, according to one or more embodiments.

FIG. 4 illustrates selection of directions within an environment for the transparent sound modification system 100 of FIG. 1 to modify, according to one or more embodiments. Although one particular embodiment including headphones is depicted, various alternative implementations (e.g., directional speakers towards user 425) are also possible.

Environment 400 provides a top-down depiction of a user 425 wearing headphones 427 on her head. The user 425 has orientation 405 within the environment 400. Though a simplified 2D representation of the user orientation and the environment is illustrated, the same principles would also apply to a 3D representation (e.g., capturing whether user 425 is leaning forward, back, to the left side, to the right side, etc.). Audio sensing zone 410 represents an overall sensing region within the ambient environment that extends from the microphones into a threshold distance in all directions. In some embodiments, audio sensing zone 410 represents the composite sensing regions of the various microphones included with headphones 427. Depending on the operational mode of sound management application 130, sounds detected by headphones 427 as coming from pass-through area 415 within the audio sensing zone 410 are permitted to pass through to user 425 without applying an active sound modification. In contrast, sounds detected by headphones 427 as coming from modification region 420 within audio sensing zone 410 are modified by sound management application 130 based on user settings.

In various embodiments, user 425 may select specific direction(s) and/or region(s) for sound modification. In one example, user 425 might select modification region 420 to be attenuated or amplified (e.g., corresponding to one of the ear cups of the headphones 427). Alternatively, user 425 might specify an angle and angular width (say a center angle of 90° from the orientation 405, with a 180° width), or multiple angles (from 0°-180°). In such instances, sounds originating from sound source 412 may be attenuated by sound management application 130, while sounds originating from sound source 414 are not altered by sound management application 130.

In some embodiments, sound management application 130 may apply active noise cancellation for a component ambient signal corresponding to sound source 412 by generating an anti-noise signal 244 that is to be included in a combined audio signal 270 reproduced by headphones 427. In such instances, the anti-noise signal 244 cancels the component ambient signal and user 425 does not hear sound source 412 even if a bleeding ambient sound 212 leaks through the passive noise cancellation effects provided by headphones 427.

In some embodiments, user 425 may provide selections of specific directions and/or regions for modification through inputs, such as mechanical controls, voice controls, physical gestures, GUI controls, and so forth. For example, each ear pad of headphones 427 may include one or more buttons that user 425 presses to selectively apply sound modifications for one or more specific directions and/or regions. The type and amount of sound modification may vary for different modification areas.

In addition to directions, a user may also specify that certain frequency ranges are to be modified. For example, sound management application 130 may apply active noise cancellation for non-periodic sounds by attenuating specific frequency values associated with a sound source. In some embodiments, a user may select a pre-defined frequency range (corresponding to speech, automobile traffic, or other common noise source ranges) that sound management application 130 will attenuate by applying a bandpass filter that attenuates the frequency range. In such instances, sound management application 130 may apply the bandpass filter in lieu of generating an anti-noise signal that is based on the non-periodic signal.

In some embodiments, the modification area(s) specified by the user may track the user's orientation, or may remain fixed despite changes to the user's orientation. For example, the user could select for cancellation all sound originating from her right side. When sound management application is in an operating mode that tracks the user, the modification area shifts with the user such that sounds coming from the user's right side at any instant (even if the user has moved) will continue to be modified. In some embodiments, sound management application 130 may estimate the locations of specific noise sources that generated the detected sounds. For example, sound management application 130 may use a known coordinate system, such as Cartesian, polar, or spherical coordinates, to specify locations of sound sources 412, 414 relative to user 425.

Environment 430 also provides a top-down depiction of the user 425. As shown, user has orientation 405, and wishes to select a specific region for modification area 450 (e.g., an area located behind the user). User 425 then sets one or more modification areas 450 and one or more pass-through areas 415 within audio sensing zone 410. For example, user 425 could select the directions by specifying particular angles. In an alternate embodiment, the user may specify a direction or particular angle, along with a modifier to describe the relative width of the modification area 450 (e.g., "narrow," "moderate," "wide").

Environment 460 also provides a top-down depiction of user 425, where user 425 specifies directions for two different modification areas 480(1), 480(2). Setting the modification areas 480(1), 480(2) may also operate to define one or more pass-through areas 470(1), 470(2) within the audio sensing zone 410. In various embodiments, user 425 may specify the angles, or ranges of angles, for each modification area 480(1), 480(2), which may be selected simultaneously or at different times.

Figure 5:
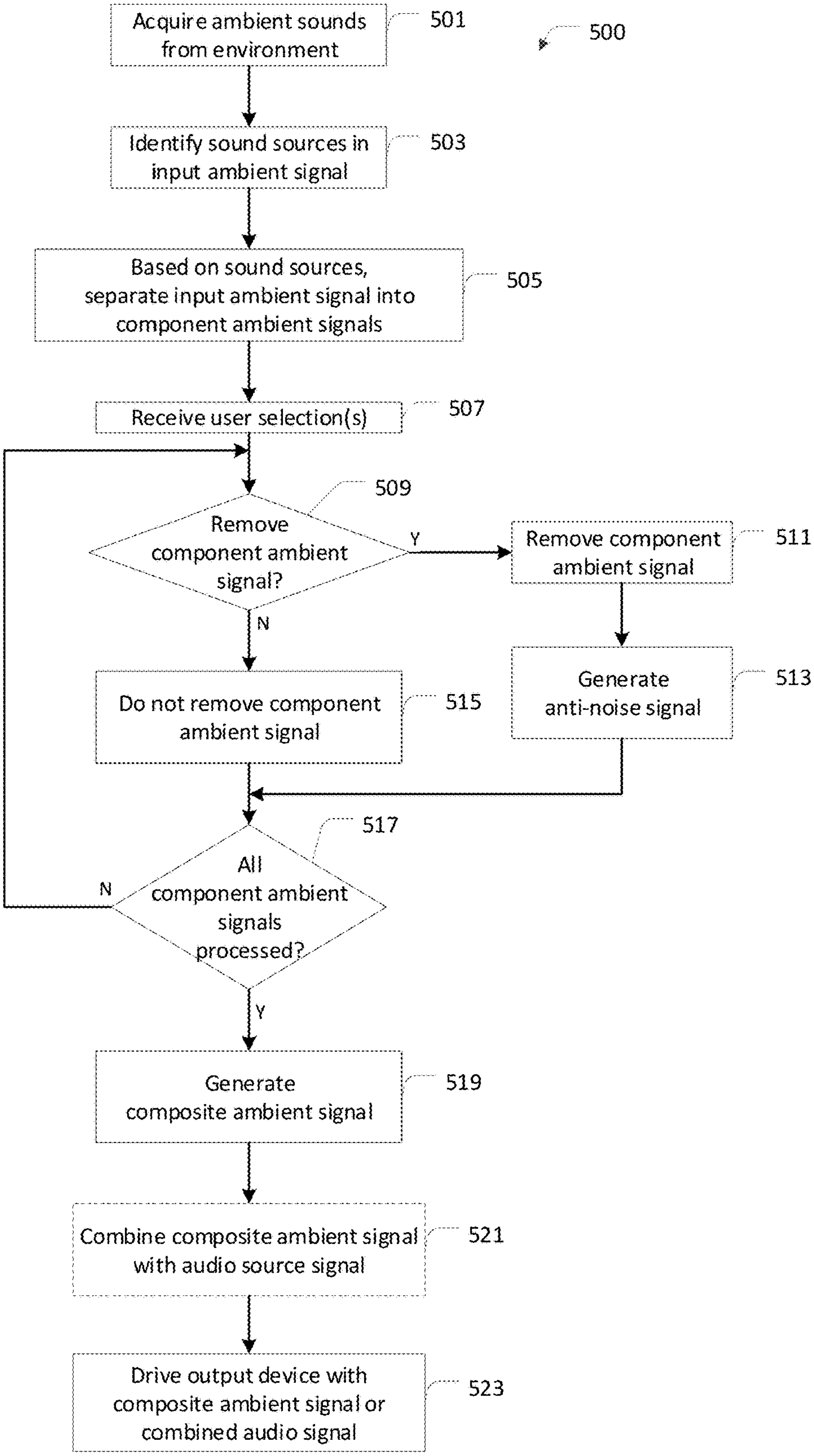
FIG. 5 is a flow diagram of method steps to apply active noise cancellation to a portion of an ambient audio signal, according to one or more embodiments.

FIG. 5 is a flow diagram of method steps to apply active noise cancellation to a portion of an ambient audio signal, according to one or more embodiments. Although the method steps are described with respect to the systems of FIGS. 1-4, persons skilled in the art will understand that any system configured to perform the method steps, in any order, falls within the scope of the various embodiments. In some embodiments, transparent sound modification system 100 may continually execute method 500 on captured audio in real-time.

As shown, method 500 begins at step 501, where transparent sound modification system 100 acquires ambient sounds from an environment. In various embodiments audio sensor(s) 272 acquire audio data originating from various sound sources 210 within an environment and generates an input ambient signal 222 from the acquired sensor data.

At step 503, transparent sound modification system 100 identifies sound sources in input ambient signal 222. In various embodiments, source identification module 132 included in sound management application 130 analyzes input ambient signal 222 in order to identify individual sound sources 224. For example, source identification module 132 could compare portions of input ambient signal 222 to one or more reference sounds stored in database 124 and/or external data store 152 in order to identify individual sound sources.

At step 505, transparent sound modification system 100 separates input ambient signal 222, based on sound sources, into component ambient signals 228. In some embodiments, source separation module 134 separates input ambient signal 222 into multiple component ambient signals 228 (e.g., 228(1), 228(2), 228(3)). For example, source separation module 134 could use the identified sound sources 210 to generate a set of component ambient signals 228, where each component ambient signal 228 corresponds to a distinct sound source. In some embodiments, source separation module 134 may have each component ambient signal 228 included in a separate audio channel 226. For example, component ambient signal 228(2) could be included in audio channel 226(2), which sound management application 130 processes independent of audio channel 226(1).

At step 507, transparent sound modification system 100 receives one or more user selections. In some embodiments, sound management application 130 may dynamically generate user interface 122 based on the set of component ambient signals 228. In such instances, a user may provide selects to modify each component ambient signal 228. Sound management application 130 may then receive the user selections and modify each component ambient signal 228 based on selections made by the user via user interface 122.

At step 509, transparent sound modification system 100 determines whether to remove a component ambient signal 228. When sound management application 130 determines that the user selected the component ambient signal 228 for removal, transparent sound modification system 100 proceeds to step 511; otherwise, sound management application 130 determines that the user did not select the component ambient signal 228 for removal and proceeds to step 511.

At step 511, transparent sound modification system 100 removes the selected component ambient signal 228 from input ambient signal 222. For example, a user could opt to remove one sound 228(3) from a set of ambient sounds that she hears. In such instances, sound management application 130 may use sound mixing module 138 to remove the component ambient signal 228. In some embodiments, sound management application 130 may apply active cancellation to the component ambient signal 228 by having signal generation module 136 generate a corresponding anti-noise signal that is used significantly attenuate or cancel the component ambient signal. Additionally or alternatively, sound management application 130 may modify parameters of audio channel 226(3), such as lowering the power of the audio channel.

At step 513, transparent sound modification system 100 generates an anti-noise signal. In various embodiments, sound management application 130 may generate an anti-noise signal 244 that is a polar inverse of the selected component ambient signal 228. In such instances, the anti-noise signal 244 would cancel an acoustic sound similar to the selected component ambient signal 228 when combined. For example, transparent sound modification system 100 could generate anti-noise signal 244 in anticipated of a bleeding acoustic sound that has characteristics similar to selected component ambient signal 228. In such instances, the anti-noise signal 244 would combine with the bleeding ambient sound to cancel the bleeding acoustic sound. In various embodiments, transparent sound modification system 100 may add anti-noise signal 244 to remove selected component ambient signal 228 from input audio signal, such as in step 511.

At step 515, transparent sound modification system 100 does not remove a given component ambient signal. Upon determining at step 509 that the user did not select the given component ambient signal for removal, sound management application 130 may reproduce or amply the given component ambient signal. At step 517, transparent sound modification system 100 determines whether each component ambient signal has been processed. If not, transparent sound modification system 100 returns to step 509 to process another component ambient signal. Otherwise, transparent sound modification system 100 proceeds to step 519.

At step 519, transparent sound modification system 100 generates a composite ambient signal 234. In various embodiments, sound mixing module 138 may mix the component ambient signals 228 that were not removed and the anti-noise signal 244 in order to generate composite ambient signal 234. In some embodiments, sound mixing module 238 may first combine the remaining component ambient signals 228 to generate a modified ambient signal 232. Sound mixing module 238 may then combine anti-noise signal 244 with modified ambient signal 232 to generate composite ambient signal 234. Composite ambient signal 234 includes each component ambient signal 228 that the user selected to hear, as well as the anti-noise signals 244 corresponding to each component ambient signal that the user selected for removal.

At step 521, transparent sound modification system 100 may optionally combine the composite ambient signal 234 with an audio source signal 260 to generate combined audio signal 270. At step 523, transparent sound modification system 100 drives output device 176 with composite ambient signal 234 or combined audio signal 270. In various embodiments, due to combined audio signal 270 including both the audio source signal 260 and the composite ambient signal 234, sound management application 130 drives an audio output device 176 to emit soundwaves that include both source audio and ambient sounds. Thus, the user can hear a selectively-transparent signal, as at least a portion of the ambient auditory environment is reproduced by output device 176 emitting soundwaves based on combined audio signal 270.

In various embodiments, one or more sound sources 210 may generate sounds that leak through various passive noise cancellation barriers. For example, when a user is wearing headphones, a sound source 210(3) could generate sounds, represented by bleeding ambient sound 212, that leak through passive noise cancellation barrier provided by the ear pad of the headphones and could potentially be heard by the user. In such instances, the anti-noise signal 244 included in composite ambient signal 234 and combined audio signal 270 cancels the bleeding ambient sound 222. As a result, when output device 176 produces soundwaves based on combined audio signal 270, at least a portion of the soundwaves provides active cancellation by canceling bleeding ambient sound 222 such that bleeding ambient sound 222 is not heard by the user.

In sum, a transparent sound modification system includes audio sensors arranged to detect sounds within an environment, and one or more output devices that provide a modified audio signal to a user. A sound management application included in a computing device of the transparent sound modification system operates to detect sounds within the environment and generate a modified audio signal that attenuates or removes at least one component signal corresponding to the detected sounds and to generate a modified ambient signal. The processing unit also generates an anti-noise signal based on the detected sound that is attenuated or removed in order to provide active noise cancellation. The processing unit includes the anti-noise signal in the modified audio signal used to drive an output device.

The processing unit drives the output device using the modified audio signal to cause the output device to emit soundwaves. Because the modified audio signal includes the anti-noise signal, a portion of the soundwave emitted by the output device cancels with any bleeding sound originating from the sound the user selected for removal. The user hears a soundwave that includes only detected sounds that the user did not select for removal.

One technological advantage of the disclosed approach relative to the prior art is that the user can select specific ambient sounds to hear when listening to a particular source signal. By removing specific component signals from an incoming ambient sound signal, the system may provide a selective acoustic transparency by reproducing only portions of an ambient acoustic environment that a user desires to hear. Further, by executing active noise cancellation on selected sounds, the disclosed approach enables a system to prevent a user from hearing particular sounds by cancelling bleeding sounds that are not removed using other noise cancellation techniques. These technical advantages provide one or more technological advancements over prior art approaches.

1. In various embodiments, a computer-implemented method comprises receiving an input signal representing an ambient auditory environment of a user, generating, from the input signal, a set of ambient audio signals that includes a first component signal and a second component signal, generating, based on the first component signal, a first inverse signal that is a polar inverse of the first component signal, removing the first component signal from the set of ambient audio signals to generate a modified set of ambient audio signals that includes at least the second component signal, generating a first composite signal that includes at least the first inverse signal and the modified set of ambient audio signals, and driving an audio output device to produce soundwaves based on the first composite signal.
2. The computer-implemented method of clause 1, further comprising receiving an audio source signal from an audio source, and combining the audio source signal with the first composite signal.
3. The computer-implemented method of clause 1 or 2, where removing the first component signal comprises adding a first copy of the first inverse signal to the modified set of ambient audio signals to generate a modified ambient signal, and generating the first composite signal comprises combining a second copy of the first inverse signal with the modified ambient signal.

4. The computer-implemented method of any of claims 1-3, where the first component signal is included in a first channel, the second component signal is included in a second channel, and removing the first component signal comprises attenuating the first channel below a defined threshold.
5. The computer-implemented method of any of claims 1-4, where the first component signal is associated with a first sound type in a plurality of source types, and the second component signal is associated with a second sound type in the plurality of source types.
6. The computer-implemented method of any of claims 1-5, further comprising comparing the first component signal to a plurality of audio recordings, where each audio recording included in the plurality of audio recordings is associated with a sound source type, identifying a first audio recording that is substantially similar to the first component signal, determining that a sound source type associated with the first audio recording is the first sound type, and associating the first component signal with the first sound type.
7. The computer-implemented method of any of claims 1-6, further comprising determining a first direction of a first sound source within the ambient auditory environment, and determining a second direction of a second sound source within the ambient auditory environment.
8. The computer-implemented method of any of claims 1-7, where removing the first component signal comprises determining a first frequency range that includes the first component signal, and applying a bandpass filter on the input signal.
9. The computer-implemented method of any of claims 1-8, where the first component signal is a non-periodic signal.
10. The computer-implemented method of any of claims 1-9, where the input signal includes a plurality of sound sources of a first sound type.
11. In various embodiments, a system comprises at least one audio sensor that acquires sound from an environment of a user and produces an input signal, an audio output device, and at least one processor coupled to the at least one audio sensor that performs the steps of receiving the input signal, generating, from the input signal, a set of ambient audio signals that includes a first component signal and a second component signal, generating, based on the first component signal, a first inverse signal that is a polar inverse of the first component signal, removing the first component signal from the set of ambient audio signals to generate a modified set of ambient audio signals that includes at least the second component signal, generating a first composite signal that includes at least the first inverse signal and the modified set of ambient audio signals, and driving the audio output device to produce soundwaves based on the first composite signal.
12. The system of clause 11, where the at least one audio sensor includes an array of audio sensors.
13. The system of clause 11 or 12, where the at least one audio sensor and the audio output device are included in a set of headphones.
14. The system of any of clauses 11-13, further comprising an output device, where the processor further performs the steps of in response to generating the set of ambient audio signals, generating a context-sensitive user interface that displays separate controls corresponding to the first component signal and the second component signal, and causing the output device to provide the context-sensitive user interface.
15. The system of any of clauses 11-14, further comprising an output device, where the processor further performs the steps of determining a location of the environment, and loading a pre-defined user interface that is associated with the location, assigning separate controls corresponding to the first component signal and the second component signal, and causing the output device to provide the pre-defined user interface.
16. The system of any of clauses 11-15, further comprising receiving an audio source signal from an audio source, and combining the audio source signal with the first composite signal.
17. The system of any of clauses 11-16, where removing the first component signal comprises adding a first copy of the first inverse signal to the modified set of ambient audio signals to generate a modified ambient signal, and generating the first composite signal comprises combining a second copy of the first inverse signal with the modified ambient signal.
18. In various embodiments, one or more non-transitory computer-readable media include instructions that, when executed by one or more processors, cause the one or more processors to perform the steps of receiving an input signal representing an ambient auditory environment of a user, generating, from the input signal, a set of ambient audio signals that includes a first component signal and a second component signal, generating, based on the first component signal, a first inverse signal that is a polar inverse of the first component signal, removing the first component signal from the set of ambient audio signals to generate a modified set of ambient audio signals that includes at least the second component signal, generating a first composite signal that includes at least the first inverse signal and the modified set of ambient audio signals, and driving an audio output device to produce soundwaves based on the first composite signal.
19. The one or more non-transitory computer-readable media of clause 18, further including instructions that, when executed by the one or more processors, cause the one or more processors to perform the steps of receiving an audio source signal from an audio source, and combining the audio source signal with the first composite signal.
20. The one or more non-transitory computer-readable media of clause 18 or 19, where removing the first component signal comprises adding a first copy of the first inverse signal to the modified set of ambient audio signals to generate a modified ambient signal, and generating the first composite signal comprises combining a second copy of the first inverse signal with the modified ambient signal.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
- receiving an input signal capturing an ambient auditory environment of a user;
- separating the input signal into a set of audio signals that includes a first component signal of a first sound type and a second component signal of a second sound type; and
- in response to generating the set of audio signals:
  - generating a context-sensitive user interface that concurrently displays a plurality of first controls and a plurality of second controls, the plurality of first controls being independent from the plurality of second controls;
  - receiving, from the user, a selection to remove the first component signal; and
  - in response to receiving the selection to remove the first component signal:
    - removing, using a first noise cancellation technique, the first component signal from the set of audio signals to generate a modified set of audio signals;
    - determining that a portion of the removed first component signal bleeds through an audio output device as a bleeding acoustic sound;
    - removing the bleeding acoustic sound using a second noise cancellation technique different from the first noise cancellation technique, wherein the second noise cancellation technique comprises generating an anti-noise signal to cancel the bleeding acoustic sound; and
    - driving the audio output device to generate sound based on the modified set of audio signals and the anti-noise signal.

2. The computer-implemented method of claim 1, wherein: the plurality of first controls comprises controls for canceling the first component signal, attenuating the first component signal, reproducing the first component signal unchanged, and amplifying the first component signal.

3. The computer-implemented method of claim 1, wherein the plurality of second controls comprises a continuum of sound pressure levels or a continuum of gain levels for adjusting a loudness of the second component signal.

4. The computer-implemented method of claim 1, further comprising:
- receiving, from the user, a selection to attenuate the second component signal; and
- in response to receiving the selection to attenuate the second component signal, reducing a power level of the second component signal in the modified set of audio signals prior to driving the audio output device based on the modified set of audio signals.

5. The computer-implemented method of claim 1, further comprising:
- receiving, from the user, a selection to amplify the second component signal; and in response to receiving the selection to amplify the second component signal, increasing a power level of the second component signal in the modified set of audio signals prior to driving the audio output device based on the modified set of audio signals.

6. The computer-implemented method of claim 1, further comprising:
comparing the first component signal to a plurality of audio recordings, wherein each audio recording included in the plurality of audio recordings is associated with a sound source type;
identifying a first audio recording that is substantially similar to the first component signal;
determining that a sound source type associated with the first audio recording is the first sound type; and
associating the first component signal with the first sound type.

7. The computer-implemented method of claim 1, wherein the first component signal comprises first ambient sounds originating from a first direction, and wherein the first direction is determined based on a direction and an angular width specified by the user.

8. The computer-implemented method of claim 1, wherein generating the modified set of audio signals further comprises:
combining a first audio channel associated with the first component signal and a second audio channel associated with the second component signal into a combined audio channel that does not include the removed first component signal.

9. The computer-implemented method of claim 1, wherein the first noise cancellation technique comprises applying active noise cancellation to non-periodic sounds included in the first component signal.

10. The computer-implemented method of claim 1, wherein the first noise cancellation technique comprises attenuating specific frequency values of the first sound type.

11. The computer-implemented method of claim 1, wherein the first noise cancellation technique comprises applying a bandpass filter to attenuate a pre-defined frequency range associated with the first sound type.

12. A system comprising:
at least one audio sensor that acquires sound from an environment of a user and produces an input signal;
an audio output device; and
a first computing device comprising one or more processors coupled to the at least one audio sensor that performs the steps of:
receiving the input signal;
separating the input signal into a set of audio signals that includes a first component signal of a first sound type and a second component signal of a second sound type; and
in response to generating the set of audio signals:
generating a context-sensitive user interface that concurrently displays a plurality of first controls and a plurality of second controls, the plurality of first controls being independent from the plurality of second controls;
receiving, from the user, a selection to remove the first component signal; and
in response to receiving the selection to remove the first component signal:
removing, using a first noise cancellation technique, the first component signal from the set of audio signals to generate a modified set of audio signals;
determining that a portion of the removed first component signal bleeds through the audio output device as a bleeding acoustic sound;
removing the bleeding acoustic sound using a second noise cancellation technique different from the first noise cancellation technique, wherein the second noise cancellation technique comprises generating an anti-noise signal to cancel the bleeding acoustic sound; and
driving the audio output device to generate sound based on the modified set of audio signals and the anti-noise signal.

13. The system of claim 12, wherein the at least one audio sensor includes an array of audio sensors or a set of headphones.

14. The system of claim 12, wherein the one or more processors further perform the step of providing the context-sensitive user interface to a second computing device for presentation to the user, the second computing device being separate from the first computing device.

15. The system of claim 12, wherein generating the context-sensitive user interface comprises:
determining a location of the environment, and loading the context-sensitive user interface that is associated with the location.

16. The system of claim 12, wherein the one or more processors further perform the steps of:
receiving an audio source signal from an audio source; and
adding the audio source signal to the modified set of audio signals prior to driving the audio output device based on the modified set of audio signals.

17. The system of claim 12, wherein the context-sensitive user interface comprises a continuum of levels for adjusting a loudness of the second component signal, and wherein the one or more processors further perform the steps of:
receiving, from the user via the context-sensitive user interface, a first level from the continuum of levels; and
amplifying or reducing a power level of the second component signal based on the first level.

18. One or more non-transitory computer-readable media including instructions that, when executed by one or more processors, cause the one or more processors to perform steps comprising:
receiving an input signal capturing an ambient auditory environment of a user;
separating the input signal into a set of audio signals that includes a first component signal of a first sound type and a second component signal of a second sound type; and
in response to generating the set of audio signals:
generating a context-sensitive user interface that concurrently displays a plurality of first controls and a plurality of second controls, the plurality of first controls being independent from the plurality of second controls;
receiving, from the user, a selection to remove the first component signal; and
in response to receiving the selection to remove the first component signal:
removing, using a first noise cancellation technique, the first component signal from the set of audio signals to generate a modified set of audio signals;
determining that a portion of the removed first component signal bleeds through an audio output device as a bleeding acoustic sound;

removing the bleeding acoustic sound using a second noise cancellation technique different from the first noise cancellation technique, wherein the second noise cancellation technique comprises generating an anti-noise signal to cancel the bleeding acoustic sound; and driving the audio output device to generate sound based on the modified set of audio signals and the anti-noise signal.

19. The one or more non-transitory computer-readable media of claim 18, wherein removing the first component signal from the set of audio signals comprises applying a bandpass filter to the set of audio signals.

20. The one or more non-transitory computer-readable media of claim 18, wherein the steps further comprise:

generating, based on the first component signal, an inverse signal that is a polar inverse of the first component signal; and adding the inverse signal to the modified set of audio signals prior to driving the audio output device based on the modified set of audio signals.

* * * * *